(12) United States Patent
Yoo

(10) Patent No.: US 7,383,545 B1
(45) Date of Patent: Jun. 3, 2008

(54) COMPUTER SYSTEM AND METHOD CAPABLE OF AUTOMATICALLY INPUTTING PRODUCT KEY OF A SOFTWARE PROGRAM UPON REINSTALLING THE PROGRAM THEREON

(75) Inventor: Chang-Woong Yoo, Kyunggi-do (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 1625 days.

(21) Appl. No.: 09/718,371

(22) Filed: Nov. 24, 2000

(30) Foreign Application Priority Data

Nov. 23, 1999 (KR) .............................. 1999-52232

(51) Int. Cl.
G06F 9/445 (2006.01)
G06F 15/177 (2006.01)

(52) U.S. Cl. ............................... 717/174; 713/1; 713/2

(58) Field of Classification Search ........ 717/168–178; 707/200–203; 713/1–2, 100, 191; 711/161–162; 726/26–33
See application file for complete search history.

(56) References Cited

U.S. PATENT DOCUMENTS

| | | | | | |
|---|---|---|---|---|---|
| 5,544,083 | A | * | 8/1996 | Iizuka et al. ................. | 708/131 |
| 5,793,868 | A | * | 8/1998 | Micali .......................... | 380/28 |
| 5,844,987 | A | * | 12/1998 | Matthews et al. ........... | 340/901 |
| 5,905,494 | A | * | 5/1999 | Krosner et al. .............. | 345/866 |
| 5,909,581 | A | * | 6/1999 | Park .............................. | 717/170 |
| 5,930,505 | A | * | 7/1999 | Miura .......................... | 717/139 |
| 6,021,408 | A | * | 2/2000 | Ledain et al. .................... | 707/8 |
| 6,075,862 | A | * | 6/2000 | Yoshida et al. ................. | 380/28 |
| 6,151,707 | A | * | 11/2000 | Hecksel et al. .............. | 717/178 |
| 6,163,841 | A | * | 12/2000 | Venkatesan et al. ......... | 713/176 |
| 6,169,976 | B1 | * | 1/2001 | Colosso ......................... | 705/59 |
| 6,202,070 | B1 | * | 3/2001 | Nguyen et al. ............ | 707/104.1 |
| 6,205,558 | B1 | * | 3/2001 | Sobel ........................... | 714/15 |
| 6,243,468 | B1 | * | 6/2001 | Pearce et al. ................ | 380/255 |
| 6,343,360 | B1 | * | 1/2002 | Feinleib .......................... | 713/1 |
| 6,411,941 | B1 | * | 6/2002 | Mullor et al. .................. | 705/59 |
| 6,490,601 | B1 | * | 12/2002 | Markus et al. .............. | 715/507 |
| 6,510,997 | B1 | * | 1/2003 | Wilz et al. .............. | 235/472.01 |
| 6,535,976 | B1 | * | 3/2003 | Hoggarth et al. .............. | 713/2 |
| 6,567,860 | B1 | * | 5/2003 | Maxwell et al. ............. | 719/327 |
| 6,578,199 | B1 | * | 6/2003 | Tsou et al. ................... | 717/178 |
| 6,681,323 | B1 | * | 1/2004 | Fontanesi et al. .............. | 713/1 |

OTHER PUBLICATIONS

"Installing Windows 98 on an Aptiva 2168 system," 1998, IBM Corp., pp. 1-3, http://members.aol.com/don5408/win98/2168.html.*

* cited by examiner

Primary Examiner—William Wood
(74) Attorney, Agent, or Firm—Robert E. Bushnell, Esq.

(57) ABSTRACT

A computer system having a hard disk drive including a product key input program for writing a product key of an operating system (OS) program in a CMOS RAM, and a CD-ROM drive including a recovery program for recovering an OS program and application programs to an initial state. Should a defect of the hard disk drive or critical error of the OS program occur, the OS program may need be reinstalled or a recovery program may be run to recover the initial states of the OS program and the application programs. The product key stored in the CMOS RAM will be used during the recovery or re-install process, so that the user does not have to manually input the product key again.

22 Claims, 12 Drawing Sheets

| 1 Byte Code | | Contents |
|---|---|---|
| bit7~bit4 | bit3~bit0 | |
| X | 0h | Not installed |
| X | 1h | Installation Of A First Program |
| X | 2h | Installation Of A Second Program |
| ⋮ | ⋮ | ⋮ |
| X | Fh | ⋮ |
| 0h | X | A First Format Of Product Key |
| 1h | X | A Second Format Of Product Key |
| 2h | X | A Third Format Of Product Key |
| ⋮ | ⋮ | ⋮ |
| Fh | X | ⋮ |

Fig. 8

| TH (2-Bit) \ FL (4-Bit) | 0h | 1h | 2h | 3h | 4h | 5h | 6h | 7h | 8h | 9h | Ah | Bh | Ch | Dh | Eh | Fh |
|---|---|---|---|---|---|---|---|---|---|---|---|---|---|---|---|---|
| 0h | 0 | 1 | 2 | 3 | 4 | 5 | 6 | 7 | 8 | 9 | : | ; | < | = | > | ? |
| 1h | @ | A | B | C | D | E | F | G | H | I | J | K | L | M | N | O |
| 2h | P | Q | R | S | T | U | V | W | X | Y | Z | [ | \ | ] | ^ | _ |
| 3h | Reservation ||||||||||||||||

| OH (1-Bit) \ FL (4-Bit) | 0h | 1h | 2h | 3h | 4h | 5h | 6h | 7h | 8h | 9h | Ah | Bh | Ch | Dh | Eh | Fh |
|---|---|---|---|---|---|---|---|---|---|---|---|---|---|---|---|---|
| 0h | B | C | D | F | G | H | J | K | M | P | Q | R | T | V | W | X |
| 1h | Y | 2 | 3 | 4 | 6 | 7 | 8 | 9 | Reservation | | | | | | | |

COMPUTER SYSTEM AND METHOD CAPABLE OF AUTOMATICALLY INPUTTING PRODUCT KEY OF A SOFTWARE PROGRAM UPON REINSTALLING THE PROGRAM THEREON

CLAIM OF PRIORITY

This application makes reference to, incorporates the same herein, and claims all benefits accruing under 35 U.S.C §119 from an application entitled Computer System And Method Capable Of Automatically Inputting Product Key Of A Software Program Upon Reinstalling The Program Thereon earlier filed in the Korean Industrial Property Office on 23 Nov. 1999, and there duly assigned Serial No. 99-52232 by that Office.

FIELD OF THE INVENTION

The present invention relates to a computer system and, more particularly, to a computer system capable of automatically inputting a product key of a software program upon reinstalling the program in the computer system and method of reinstalling a software program.

BACKGROUND OF THE INVENTION

Every general-purpose computer has an operating system to provide a user interface between a user and the computer and to run other programs on the computer. Operating system programs provide a software platform on top of which other programs, called application programs, are able to run, and perform basic tasks, such as recognizing an input from a keyboard, sending an output to a display apparatus, keeping track of files and directories on disks, and controlling peripheral devices such as disk drives and printers.

Currently, most PC manufacturers provide a bundle of basic and essential software programs already installed in the computers being offered for sale, for user's convenience. Thus, upon purchasing a new computer, a user has no need to install such programs, and all that is required is for the user to register the installed programs with the programs' manufacturers.

If a user bought a computer operated with a Windows® 98 operating system program, he may first add information to some part of the program to his computer if necessary and compose the program to his environment, such as inscription of his name, keyboard composition, time setting, and so on, to complete the installation of the program.

In such a user program install process, a user must correctly input a product key of the program into product key input window, otherwise the program cannot be completely installed and will not operate until the correct product key is input. In other software programs, which must be completely installed by the user, the product key, also known as the product ID, product certificate information or serial number, must be correctly entered before any part of the program can be installed.

Current software programs, however, have complex product key structures (e.g., the Windows® 98 program has a product key of 25 characters), thus there is a high probability that an error occurs in inputting the product key unless a user carefully checks each character of a product key. Also, since software program product keys are typically stored in a specific area of a hard disk in the hard disk drive, should the user have to reinstall the software programs on his/her computer due to a software failure or due to damage to a portion of the hard disk, etc, then the user must manually input the product keys again for the software being reinstalled. However, if the user cannot find the authentication certificate of a program and has no record of the product key of the program, he cannot reinstall the software. Moreover, if the operating system software had to be reinstalled, or a disk recovery operation needed to be performed, and the user had no record of the product key for the operating system software, the computer would be inoperable until either new software was purchased or, if the software was properly registered, the manufacturer could provide the necessary information to the user.

SUMMARY OF THE INVENTION

Therefore, an object of the present invention is to provide computer systems and methods capable of improving product key retention reliability.

It is another object of the present invention to provide computer systems and methods capable of conveniently reinstalling software programs that require product key input.

According to an aspect of the present invention, a computer system having an operating system program containing product key information includes a first storage step for storing the operating system program, a second storage step for storing the product key information of the operating system program when the operating system program is first installed in the first storage step, a write means for writing the product key information in the second storage step, and input means for reading out the product key information from the memory means and inputting the read-out information in an information input window for product authentication of the operating system program when a reinstalled operating system program is matched with an operating system program corresponding to the product key information written in the memory means.

According to another aspect of the present invention, a computer system has a central processing unit (CPU), a main memory, a BIOS ROM, and an auxiliary memory for storing information set by the BIOS ROM, and uses an operating system program containing product key information. A method of writing the product key information in the auxiliary memory when the operating system program is installed first comprises the steps of making a user manually input the product key information corresponding to a procedure of installing the operating system program; executing the product key information writing program; and writing the manually input product key information into the auxiliary memory.

According to further another aspect of the present invention, a computer system has an operating system program containing product key information and comprising a central processing unit (CPU), a main memory, an auxiliary memory for storing the product key information, and at least one auxiliary memory device. A method of automatically inputting the product key information manually input by a user when the operating system program is first installed comprises the steps of reading out the product key information form the auxiliary memory; checking whether the read-out product key information is matched with product key information of an operating system program that will be reinstalled; and, if matched, automatically inputting the product key information in a product key information input window of the operating system program.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein:

FIG. 5 shows a format of a program install flag according to the present invention;

FIG. 8 shows a code table for use with the code format of FIG. 7;

FIG. 10 shows a code table for use with the code format of FIG. 9;

DESCRIPTION OF THE PREFERRED EMBODIMENT

Figure 1:
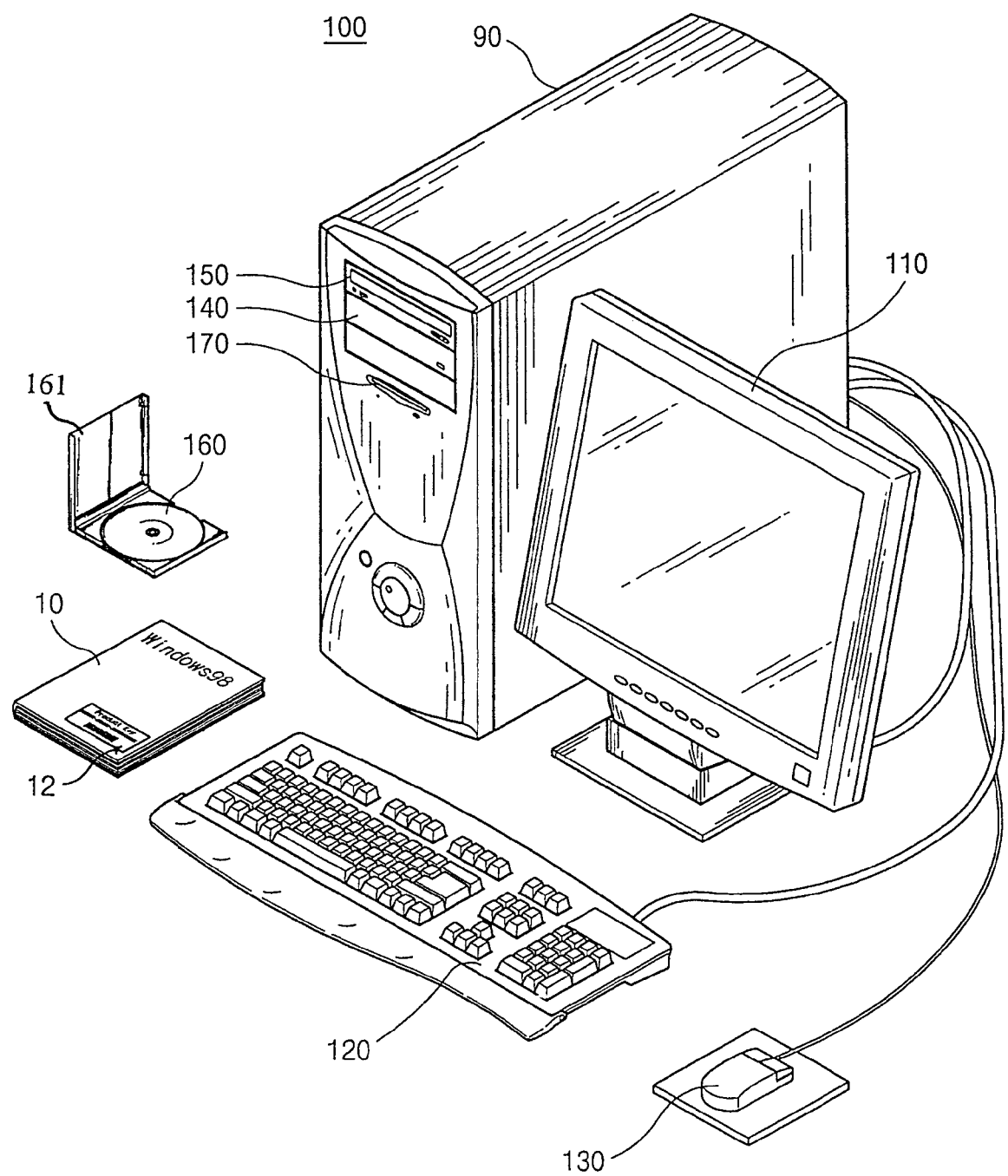
FIG. 1 is a perspective view showing a computer system according to the present invention.

FIG. 1 shows a computer system 100 according to the present invention, which comprises a system unit 90, a display device 110, an alphanumeric input device 120 such as a keyboard, and a point device 130 such as a mouse. The system unit 90 is equipped with one or more hard disk drives (HDDs) 140 (and 144 of FIG. 3), a compact disk read only memory (CD-ROM) drive 150, a floppy disk drive (FDD) 170, and other mass storage devices such as a digital versatile disk (DVD) player (not shown).

Also, the computer system 100 contains a bundle of software programs including an essential part of an operating system (OS) program and other application programs, all of which are installed by a computer manufacturer or user and stored in the hard disk drive 140.

A commercial software program, such as a Windows® OS program, is usually provided with a manual 10 including an authentication certificate for the program. For example, the authentication certificate of a Windows® 98 OS program contains a product key 12 printed thereon. Additionally, the product key may be printed on a label (not shown) attached to the case 161 for compact disk 160 having the Windows® 98 OS program stored thereon. A product key 12 of a Windows® 98 OS program is composed of 25 characters.

Figure 2:
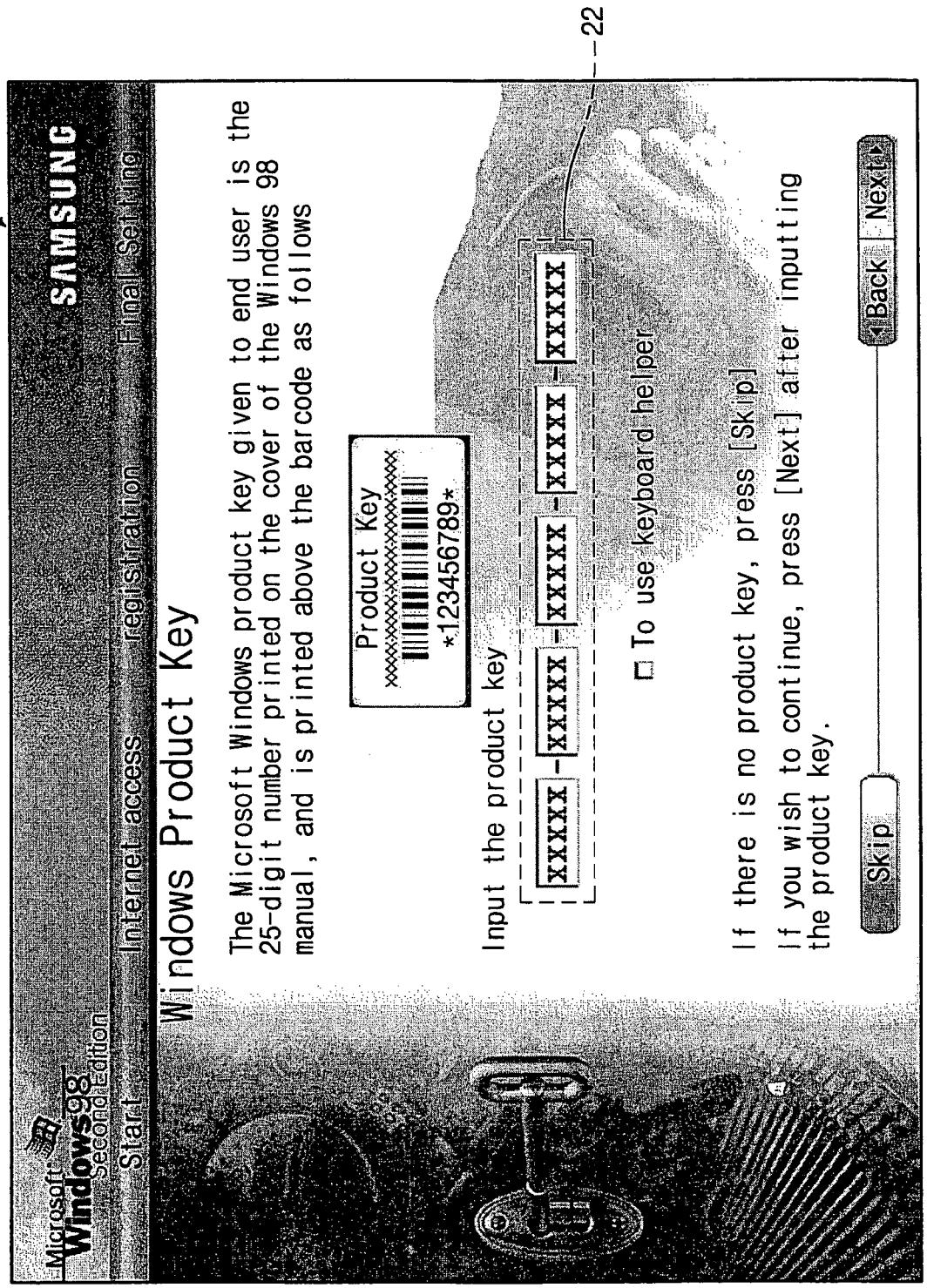
FIG. 2 shows a product key input window displayed on a display screen of a computer system upon installing a software program that requires product key input.

FIG. 2 shows a product key input screen 20 displayed on a display screen of display device 110 upon installing a software program that requires the user to input the product key. In such an installation process, it is required to correctly input a product key 12 of the program in a product key input window 22 of the product key input screen 20.

Figure 3:
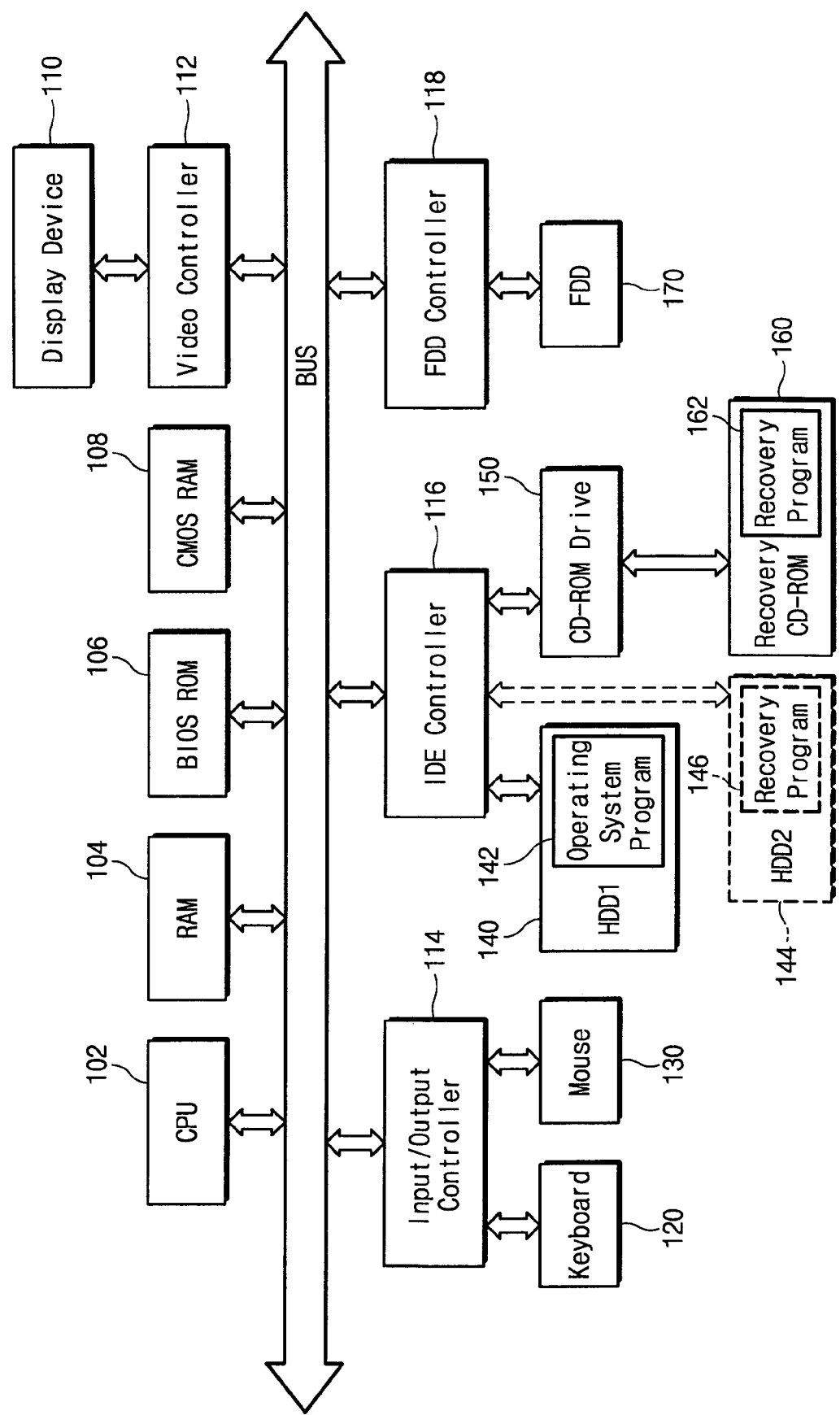
FIG. 3 is a block diagram showing a circuit configuration of an embodiment of a computer system of FIG. 1.

FIG. 3 shows a circuit configuration of the computer system 100 as shown in FIG. 1. Referring to FIG. 3, the computer system 100 includes a central processing unit (CPU) 102, a main (RAM) memory 104, a basic input output system (BIOS) ROM 106, a complementary metal oxide semiconductor (CMOS) random access memory (RAM) 108 for BIOS setup, a video controller 112, an input/output (I/O) controller 114, an intelligent or integrated drive electronics (IDE) controller 116, and an FDD controller 118, all of which are coupled to a bus such as a processor bus, a peripheral component interconnect (PCI) bus, an industrial standard architecture (ISA) bus, or a system management (SM) bus.

I/O controller 114 is coupled to the alphanumeric input device 120 such as a keyboard and to the pointing device 130 such as a mouse. IDE controller 116 is coupled to one or more hard disk drives (HDDs) 140 and 144. And, FDD controller 118 is coupled to the FDD 170.

BIOS ROM 106 stores a BIOS program that controls the booting operation of the computer system using HDD 140 or CD-ROM 160 in accordance with the information stored in CMOS RAM 108.

As is well known, although the CMOS RAM 108 is a volatile memory, it is operated by a battery and thus acts like a non-volatile memory. That is, the CMOS RAM 108 always retains the BIOS setup information without loss of the information upon system power-off.

The computer system 100 also includes a product key input program installed by the manufacturer and stored in the HDD 140. The product key input program writes a product key of a software program into the CMOS RAM 108 used for BIOS setup of the computer 100. The product key input program preferably is installed when an OS program is installed for the first time.

The system 100 further includes a system recovery CD-ROM 160 that contains a system recovery program for the recovery of the software programs stored in the hard disk drive 140. When OS and application programs of the computer 100 become defective, the system recovery program restores those defective programs to their original installation states. According to the present invention, the recovery program automatically writes a product key stored in the CMOS RAM 108 into a product key window 22 when a program is reinstalled.

In the system memory map, the CMOS RAM 108 corresponds to I/O ports 70h-73h. The ports 70h and 71h are the IBM® personal computer standard CMOS RAM ports, and the other ports 72h and 73h are additional ports according to the present invention. The port 72h is used to store an offset value of a location of the CMOS RAM 108 that is subjected to a read or write operation. A data item is read from or written into the location indicated by the offset value via the port 73h. That is, the additional ports 72h and 73h serve as additional index and data ports of the CMOS RAM 108, respectively.

For example, assuming that an offset value is stored in a storage location 38h of the CMOS RAM 108, a processor, such as the CPU 102, reads a data item corresponding to the offset value from the CMOS RAM 108 as shown in the following Table 1.

TABLE 1

| MOV | AL, | 38h ; | (38h) ? | AL |
| OUT | 72h, | AL ; | (AL) ? | 72h |
| IN | AL, | 73h ; | (73h) ? | AL |

First, a content of location 38h (i.e., an offset value) is moved into a register AL in the processor. The processor then writes the offset value stored in its register AL into the index port 72h of the CMOS RAM 108 so that a data item stored in a CMOS RAM location corresponding to the offset value is read out and stored in the data port 73h of the CMOS RAM 108. Thereafter, the processor reads the data item from the data port 73h and stores it into its register AL. In this manner, a product key of an software program such as an OS program, stored in the CMOS RAM 108, can be read out from a specific area thereof under the control of the recovery program.

In the computer system 100, HDDs 140 and 144 act, respectively, as a primary device containing at least one OS program for system booting and a secondary device for optional functions. While the primary HDD 140 stores an OS program 142 and application software programs, the secondary HDD 144 stores a copy version 146 of the recovery program 162 contained in the recovery CD-ROM 160. The copied program 162 is used to restore the OS and application programs to their initial installation states.

CD-ROM drive 150 can be used as a boot device, like HDD 140. Also, when a software program fails, the CD-ROM drive 150 can directly recover or reinstall the programs using the CD-ROM 160. At this time, the CD-ROM drive 150 reads a product key of the software program from CMOS RAM 108, and then automatically inputs it into a product key input window 22 produced by the CD-ROM 160 upon reinstallation of the defective software program.

Figure 4:
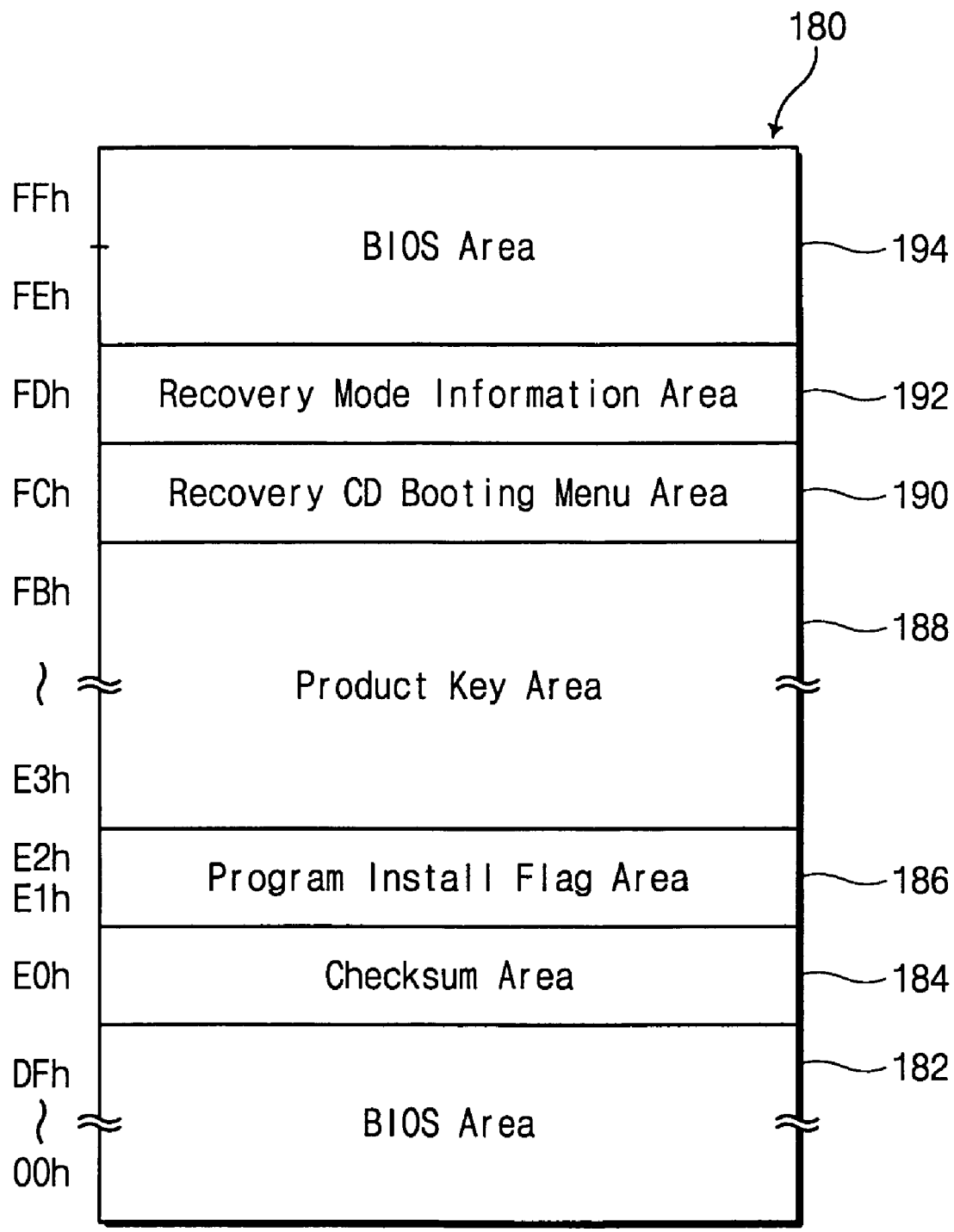
FIG. 4 shows a storage region of the CMOS RAM shown in FIG. 3.

FIG. 4 shows a storage region 180 of the CMOS RAM 108 shown in FIG. 3. Referring to FIG. 4, the storage region 180 of CMOS RAM 108 includes BIOS areas 182 and 194, a checksum area 184, a program install flag area 186, a product key area 188, a recovery CD booting menu area 190, and a recovery mode information area 192.

The BIOS areas 182 (00h-DFh) and 194 (FEh-FFh) are available to a BIOS only and cannot be employed for other use.

The checksum area 184 (E0h) is used to determine whether a product key written into the CMOS RAM 108 is correct by checking whether a result of summing up contents of the product key storage area 188 with contents of the program install flag area 186 by bytes is zero ('0').

The program install flag area 186 (E1h-E2h) is used for indicating which program is being installed. In other words, a product key presently being stored in the CMOS RAM 108 is provided for which program.

The recovery CD booting menu area 190 (FCh) stores information about the boot device that is determined by BIOS CMOS setup, as shown in Table 2.

TABLE 2

| Setting Code | Boot Device |
| --- | --- |
| 1 | FDD |
| 2 | HDD |
| 3 | CD-ROM drive |
| 4 | PCMCIA device |
| 5 | USB device |
| 6 | Embedded Network device |

The recovery mode information area 192 (FDh) is used to store information about functions that will be carried out after system booting using the recovery CD-ROM 160, in which the information is stored by bytes. As shown in Table 3, the area 192 determines whether the system 100 will be restored to its initial state or only an OS program will be installed.

TABLE 3

| Setting Code | Contents |
| --- | --- |
| 0 | Restore System To Initial State |
| 1 | Installing Only an OS Program |

The product key input storage area 188 (E3h-FBh) preferably has a 25-byte storage size and each character of the product key is preferably represented by an 8-bit ASCII code. However, area 188 may have various sizes enough to retain all the product key characters of the programs installed in the system 100, and each character may be represented by a 6-bit code, a 5-bit code, or other codes defined by computer makers in accordance with the character numbers of product keys.

FIG. 5 shows a format of a program install flag 186a according to the present invention. Referring to FIG. 5, the program install flag 186a is an 8-bit code. In FIG. 5, X symbols mean 'don't care' values, i.e., it doesn't matter if each bit of 4-bit codes has any of the hex values 0h-Fh. The lower 4-bit portion, bit0-bit3, of the flag 186a indicates the types of software programs installed such as Windows® OS programs, or other application programs. For example, the lower bit portion of '0h' indicates that no program is installed, '1h' indicates that Windows® 98 is installed, and '2h' indicates that Windows® 98 SE is installed. the upper 4-bit portion, bit4-bit7, of the flag 186a indicates the bit formats of the product keys. For example, the upper bit portion of '0h' indicates an eight-bit format, '1h' indicates a 6-bit format, and '2h' indicates a 5-bit format. For example, when a Windows® 98 SE OS program is installed, each character of the OS program's product key is preferably encoded into 8 bits with lower 4 bits of '2h' and upper 4 bits of '0h'.

Figure 6:
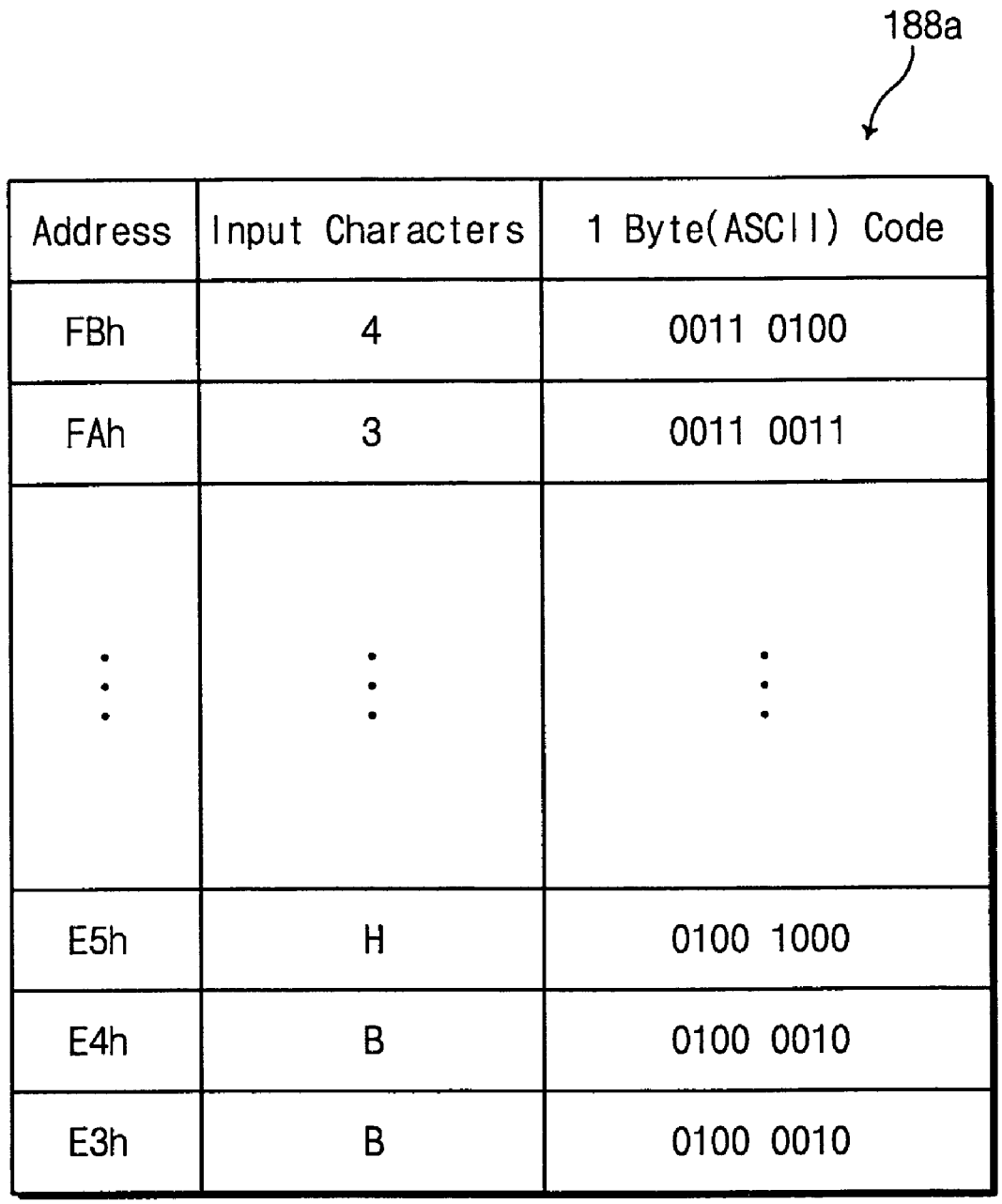
FIG. 6 shows a first format of a product key code according to the present invention.

FIG. 6 shows an 8-bit format 188a of a product key code according to the present invention. As shown in FIG. 6, characters of a product key of '43 . . . HBB' are encoded into 8-bit ASCII codes, respectively, and then are stored in the product key area 188 (E3h-FBh) of the CMOS RAM 108. For example, the first character B of ASCII code '01000010' is stored at storage location E3h, and the last character 4 of ASCII code '00110100' is stored at location FBh.

Figure 7:
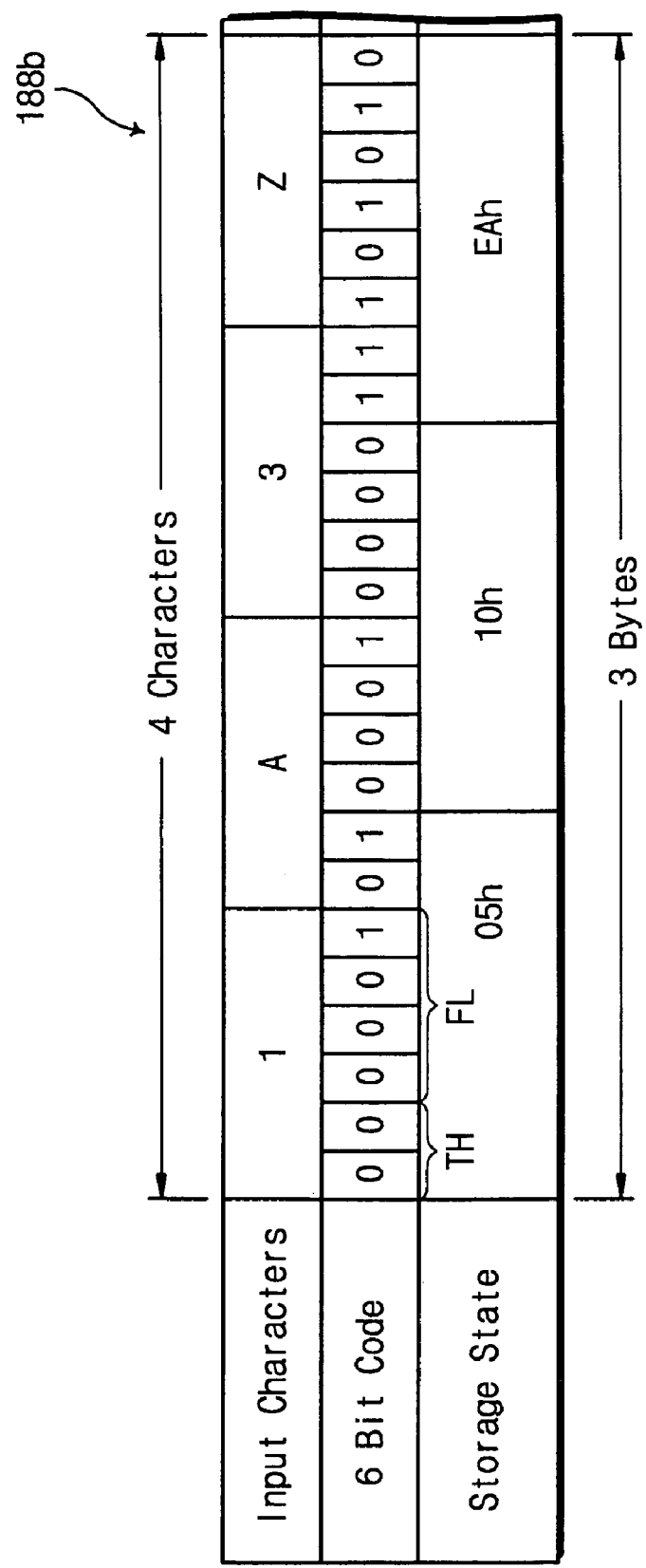
FIG. 7 shows a second format of the product key code according to the present invention.

FIG. 7 shows a 6-bit format 188b of the product key code, and FIG. 8 shows a code table 200 for use with the code format 188b. Referring to FIG. 7, each character code has 2 higher-order bits TH and 4 lower-order bits FL. For example, the ASCII character 'A' is represented by a 6-bit code '010001' in accordance with the code table of FIG. 8. This format 188b permits representing the product key having a maximum number of 32 ASCII characters as 24 bytes using a compress conversion process. That is, as shown in FIG. 7, an example of 4 characters are encoded into 3 bytes using the code table 200 of FIG. 8. A 6-bit code of a character is encoded by subtracting 30h from the value of a corresponding ASCII code so that the value of the 6-bit code is in a range of 00h-3Fh. For Example, the ASCII character 'Z' has a hex value of 5Ah; subtracting 30h from 5Ah results in a hex value 2Ah; and the binary value of 2Ah is 00101010. Thus the 6-bit code of the ASCII character 'Z' is 101010. In limiting the 6-bit code to a range of 00h-3Fh (binary values 000000~111111) the product key may include the ASCII characters shown in FIG. 8 with the reservation area being available for the ASCII characters (' and a~o).

Figure 9:
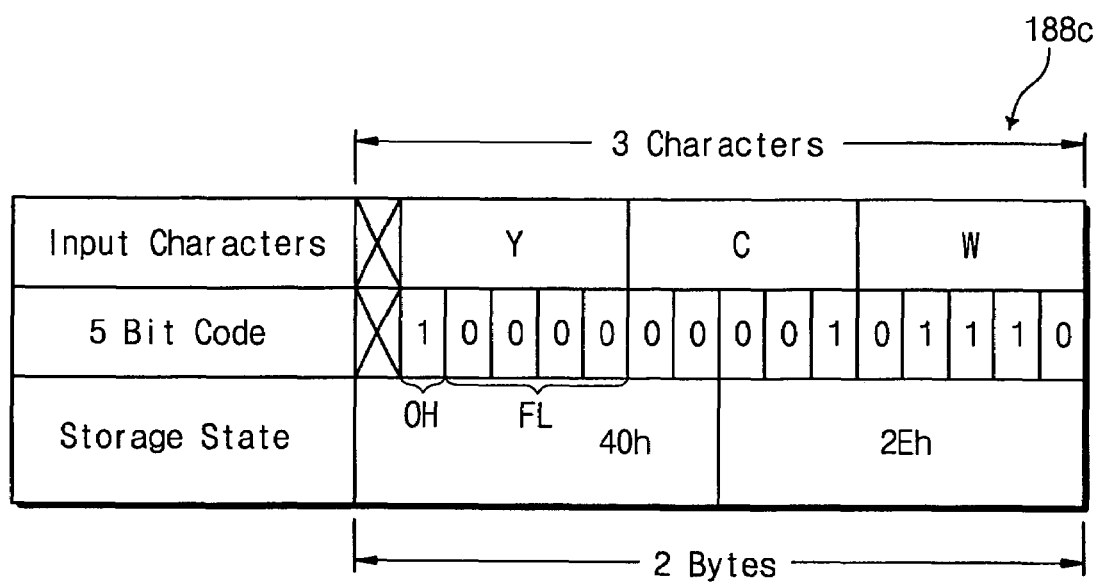
FIG. 9 shows a third format of the product key code according to the present invention.

FIG. 9 shows a 5-bit format 188c of the product key code, and FIG. 10 shows a code table 210 for use with the code format 188c. Referring to FIG. 9, each character code has 1 higher-order bit OH and 4 lower-order bits FL. For example, the ASCII character 'Y' is represented by a 5-bit code '10000' in accordance with the code table of FIG. 10. This format 188c allows 3 characters to be encoded into 2 bytes using the code table 210 of FIG. 10 and the compress conversion process of FIG. 9, so that it can represent a product key having up to 40 ASCII characters.

Figure 11:
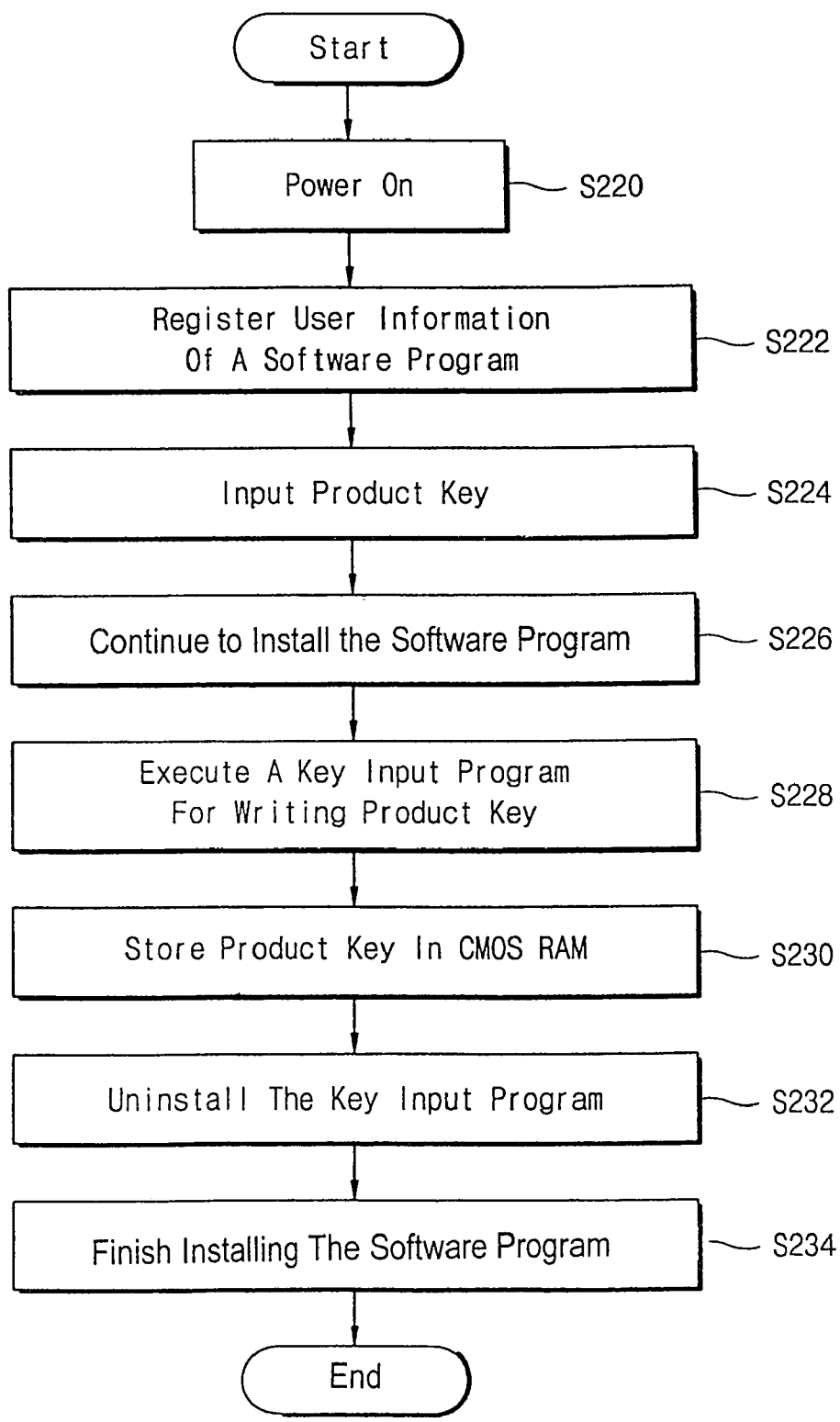
FIG. 11 is a flowchart showing a program install process according to the present invention.

FIG. 11 is a flowchart showing a program install process according to the present invention. For convenience of explanation, the process of FIG. 11 will be described using a specific example, i.e., a user install process of an OS program, such as one of the Windows® family, however, it should be understood that the inventive concept of the present invention is applicable to installation of other software programs.

As described earlier in the background section of this specification, most PC makers provide computers installed with a bundle of basic and essential software programs. Thus, upon purchasing a new computer with an OS program and upon turning on the computer, S220, a user may be required to first add some part of the OS program to his computer such as registering user information S222.

Thereafter, the user may have to input a product key of the OS program, S224, which is stored in a specific area of HDD 140, so that the installation of the OS program continues, S226. At this time, a processor, such as CPU 102, executes the product key input program stored in the HDD 140, S228 so that the product key is read out from the HDD 140 and is written into the CMOS RAM 108, S230. After completion of writing the product key into the CMOS RAM 108, the key input program stored in the HDD 140 is automatically uninstalled stored from the HDD 140, since it is no longer needed, S232. At this time, the installation of the OS program may not be fully complete, so in step S234, the OS program continues to be installed until finished.

Figure 12:
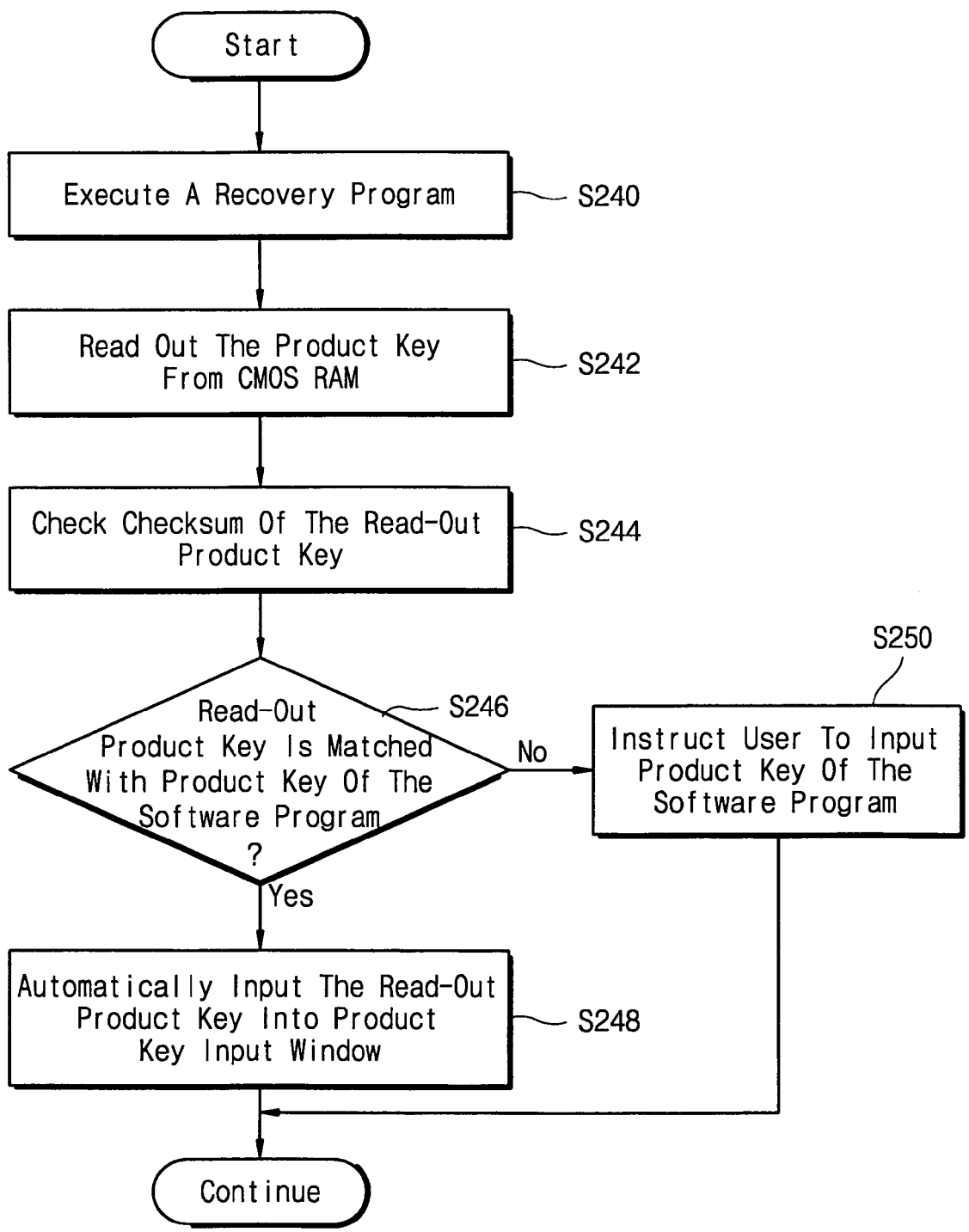
FIG. 12 is a flowchart showing a program re-install process according to the present invention.

FIG. 12 is a flowchart showing a program recovery (or re-install) process according to the present invention. Referring to FIG. 12, when the OS program stored in the HDD 140 becomes defective, first, a processor, such as CPU 102, executes the system recovery program 162 stored in the system recovery CD-ROM 160 by using the CD-ROM drive 150, or system recovery program 146 stored in the HDD 144, in order to restore the defective program to its original installation state, S240. Next, the processor reads out the product key of the defective OS program from the CMOS RAM 108, S242.

After a checksum of the read-out product key is checked, S244, to identify the correctness of the read-out data, it is determined whether or not the read-out product key is matched with the product key of the OS program, S246, stored in the system recovery program (162 or 146). If so, the read-out product key is input to a product key input window 22 for reinstallation of the OS program, S248, but if not, the processor instructs the user to input the product key of the OS program, S250.

The foregoing description of the embodiments of the present invention has been presented for purposes of illustration and description. It is not intended to limit the present invention to the embodiments disclosed, and obviously many modifications and variations are possible in light of the above teachings.

What is claimed is:

1. A computer system having a central processing unit, a main memory, a BIOS ROM, a display device, and input devices, and using an operating system program containing product key information, the computer system comprising:
    storing means for storing the operating system program;
    memory means storing BIOS setup information used by a BIOS program stored in said BIOS ROM, said memory means storing the product key information of the operating system, said product key information being input by a user, when the operating system program is initially installed in the storing means;
    writing means for writing the product key information in the memory means; and
    input means for reading out the product key information from the memory means and inputting the read-out product key information in an information input window for product certification of the operating system program when a product key of an operating system program being reinstalled is matched with the read-out product key information.

2. The computer system of claim 1, wherein the storing means is a boot device.

3. The computer system of claim 1, wherein the memory means further stores information indicating the type of operating system program that was installed and indicating a compress conversion process of the product key information.

4. The computer system of claim 1, wherein the writing means is a program installed in the storing means.

5. The computer system of claim 1, wherein the input means is a program.

6. In a computer system having a central processing unit, a main memory, a BIOS ROM, and an auxiliary memory for storing BIOS setup information used by a BIOS program stored in the BIOS ROM, and using an operating system program containing product key information, a method of writing the product key information into the auxiliary memory when the operating system program is first installed, the method comprising the steps of:
    making a user manually input the product key information corresponding to a procedure of installing the operating system program;
    executing a product key information writing program; and
    writing the manually input product key information into the auxiliary memory.

7. The method of claim 6, further comprising a step of deleting the product key information writing program after the product key information is written into the auxiliary memory.

8. In a computer system having an operating system program containing product key information and comprising a central processing unit, a main memory, an auxiliary memory having the product key information, manually input by a user when the operating system program was first installed, stored therein, a method of automatically re-inputting the product key information when reinstalling the operating system program, the method comprising the steps of:
    reading out the product key information from the auxiliary memory;
    checking whether the read-out product key information is matched with product key information of an operating system program that will be reinstalled; and
    if matched, automatically inputting the product key information in a product key information input window displayed on a screen corresponding to an installation procedure for reinstalling the operating system program.

9. The method as set forth in claim 8, wherein said step of checking comprises comparing the read-out product key information with product key information of an operating system program stored on a recovery CD-ROM in a CD-ROM drive.

10. The method as set forth in claim 8, wherein said step of checking comprises comparing the read-out product key information with product key information of an operating system program stored on a hard disk of a recovery hard disk drive.

11. A system recovery method for computer system having a central processing unit, at least one hard disk drive, a BIOS ROM, a CMOS RAM, a CD-ROM drive, a display device, and input devices, said computer system using an operating system program stored on a hard disk in said hard disk drive, said system recovery method comprising the steps of:

manually inputting, using one of said input devices, product key information corresponding to said operating system program, said product key information being input into a product key input window of a product key input screen displayed on said display device;

executing a key input program stored on said hard disk for writing said product key information into a predetermined storage area of said CMOS RAM;

executing a recovery program stored in a recovery storage device when said operating system program fails;

reading out said product key information from said CMOS RAM when said recovery program is executed;

comparing said product key information read out from said CMOS RAM with product key information stored in said recovery storage device; and automatically inputting the product key information read out from said CMOS RAM into said product key input window of the product key input screen displayed on said display device.

12. The method as set forth in claim 11, further comprising a step of storing said product key information manually input into said product key input window onto said hard disk.

13. The method as set forth in claim 12, said step of executing a key input program comprising the steps of:

reading said key input program from said hard disk;

encoding said product information using a compression conversion process to produce encoded product key information; and storing said encoded product key information in said predetermined storage area of said CMOS RAM.

14. The method as set forth in claim 13, further comprising a step of uninstalling said key input program from said hard disk after said storing step.

15. The method as set forth in claim 13, wherein said product key information is comprised of a plurality of ASCII characters and said compression conversion process comprises the steps of:

converting each ASCII character into a six bit code; and generating hexadecimal values for storage in said CMOS RAM by grouping the bits of the six bit codes corresponding to every four ASCII characters into three bytes.

16. The method as set forth in claim 15, wherein said step of converting each ASCII character into a six bit code comprises subtracting the hexadecimal value 30h from the hexadecimal of the ASCII character.

17. The method as set forth in claim 15, wherein said step of converting each ASCII character into a six bit code comprises reading preset hexadecimal values for each ASCII character from a code table and changing the read hexadecimal values to binary values.

18. The method as set forth in claim 13, wherein said product key information is comprised of a plurality of ASCII characters and said compression conversion process comprises the steps of:

converting each ASCII character into a five bit code; and generating hexadecimal values for storage in said CMOS RAM by grouping the bits of the five bit codes corresponding to every three ASCII characters into two bytes.

19. The method as set forth in claim 18, wherein said step of converting each ASCII character into a five bit code comprises reading preset hexadecimal values for each ASCII character from a code table and changing the read hexadecimal values to binary values.

20. The method as set forth in claim 11, further comprising a step of checking a checksum of said product key information read out from said CMOS RAM before comparing said product key information read out from said CMOS RAM with product key information stored in said recovery storage device.

21. The method as set forth in claim 11, wherein the step of executing a recovery program comprises reading a recovery program stored on a second hard disk of a second hard disk drive.

22. The method as set forth in claim 11, wherein the step of executing a recovery program comprises reading a recovery program stored on a recovery CD-ROM in a CD-ROM drive.

* * * * *